(12) United States Patent
Ishizaki

(10) Patent No.: US 8,349,266 B2
(45) Date of Patent: Jan. 8, 2013

(54) PLASMA GENERATOR AND REACTION APPARATUS

(75) Inventor: Yuichiro Ishizaki, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 488 days.

(21) Appl. No.: 12/594,167

(22) PCT Filed: Mar. 27, 2008

(86) PCT No.: PCT/JP2008/055876
§ 371 (c)(1),
(2), (4) Date: Feb. 2, 2010

(87) PCT Pub. No.: WO2008/123357
PCT Pub. Date: Oct. 16, 2008

(65) Prior Publication Data
US 2010/0135867 A1    Jun. 3, 2010

(30) Foreign Application Priority Data
Mar. 30, 2007    (JP) .................. 2007-090847

(51) Int. Cl.
*B01J 19/08*    (2006.01)
(52) U.S. Cl. .................................. 422/186.04
(58) Field of Classification Search .............. 422/186.04
See application file for complete search history.

(56) References Cited

U.S. PATENT DOCUMENTS
2006/0196762 A1    9/2006   Miki et al. ................. 204/157.3

FOREIGN PATENT DOCUMENTS
| | | |
|---|---|---|
| JP | 2001-193442 | 7/2001 |
| JP | 2002-129947 | 5/2002 |
| JP | 2002-221027 | 8/2002 |
| JP | 2005-203362 | 7/2005 |
| WO | WO 2004/114729 A1 | 12/2004 |

OTHER PUBLICATIONS

Japanese language office action dated Nov. 30, 2010 and its English language translation for corresponding Japanese application 2009509163.

Japanese language office action dated Sep. 7, 2010, and its English language translation for corresponding Japanese application 2009509163.

*Primary Examiner* — Kishor Mayekar
(74) *Attorney, Agent, or Firm* — DLA Piper LLP (US)

(57) ABSTRACT

Provided is a plasma generator which can eliminate breakage due to thermal stress without deteriorating plasma generating efficiency. A plasma generator 1 has an base member 3 provided with a discharge space 5 and a pair of electrodes 9 provided on the base member 3 while sandwiching the discharge space 5 therebetween, wherein at least one electrode 7 of the pair of electrodes 9 has a plurality of electrode layers 15 provided at positions different from each other in a facing direction of the pair of electrodes 9.

11 Claims, 13 Drawing Sheets

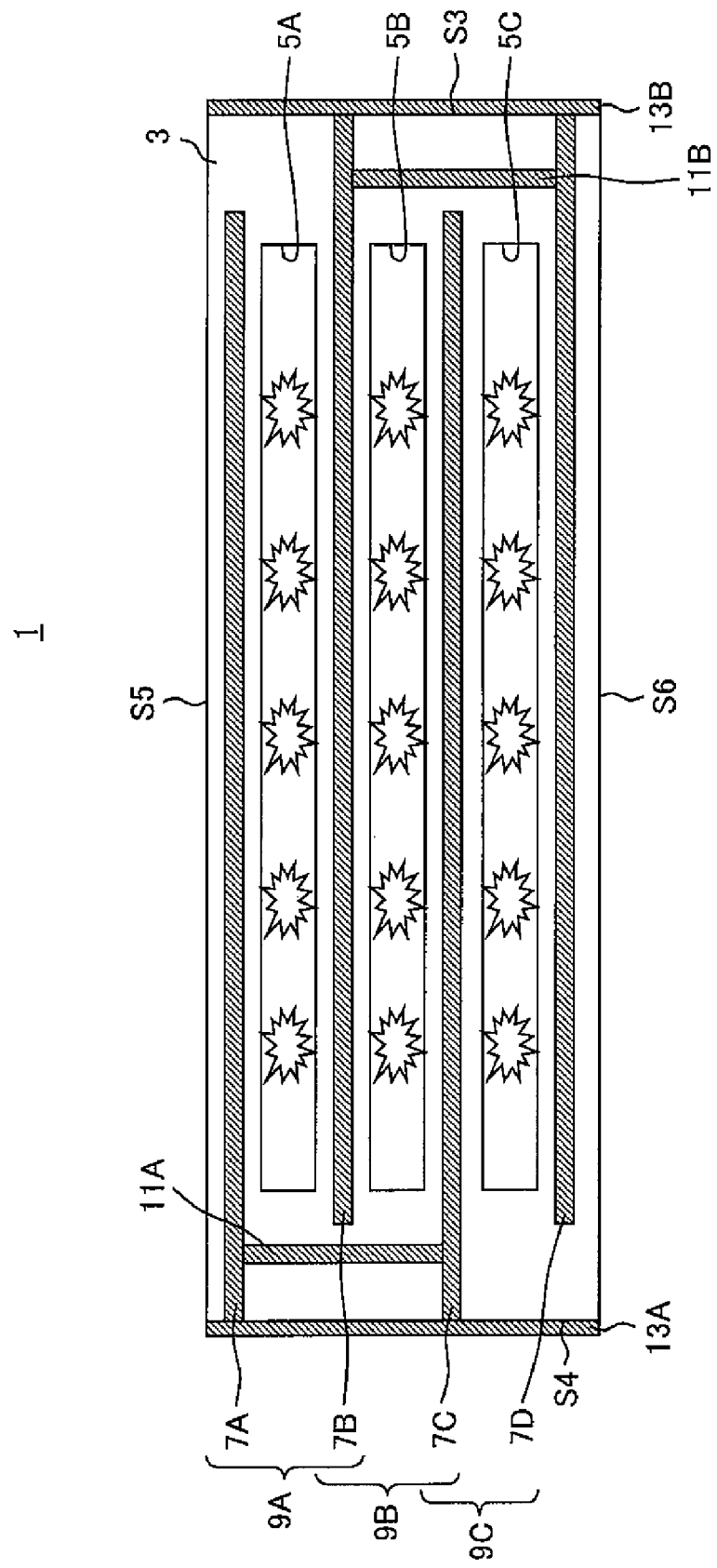

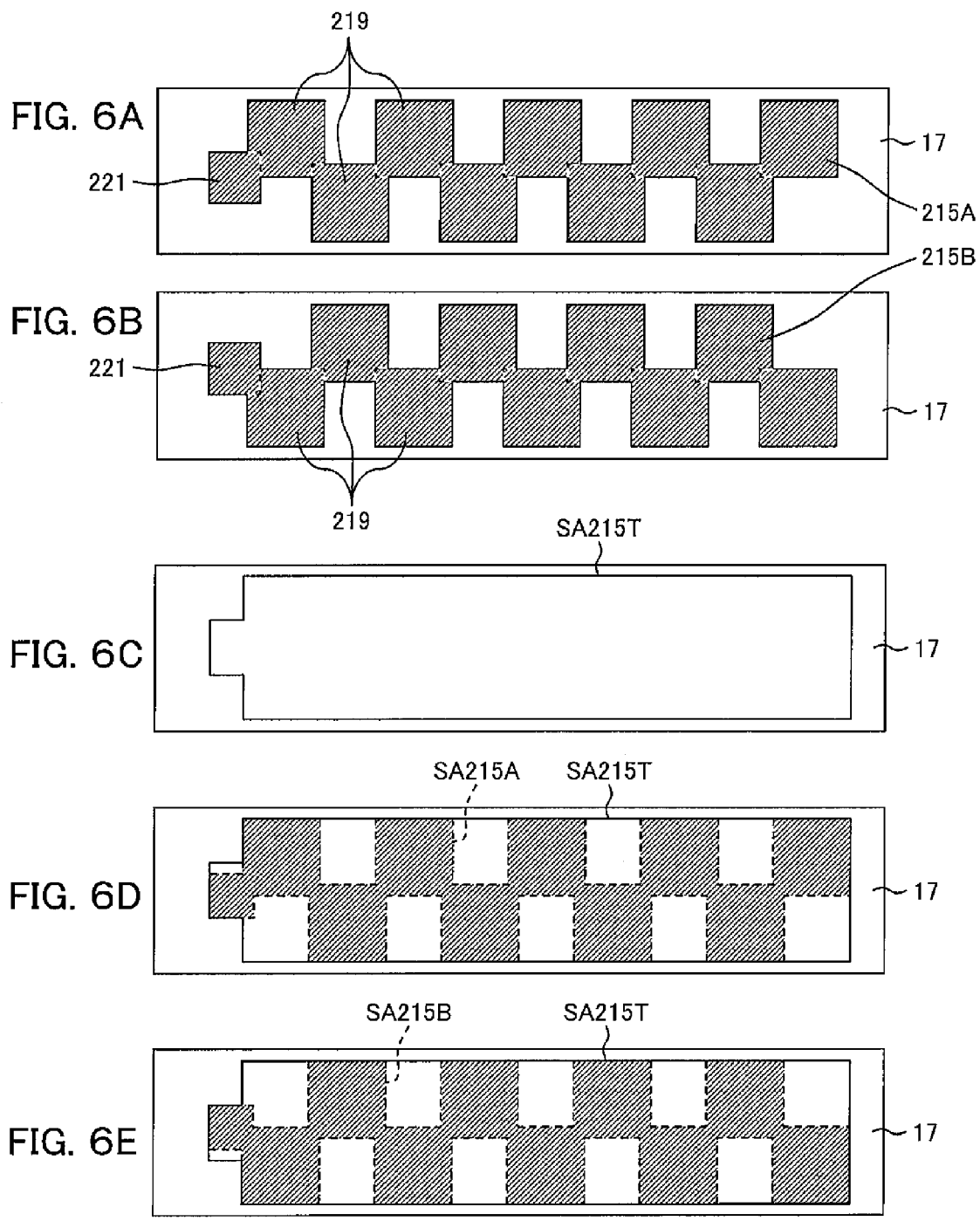

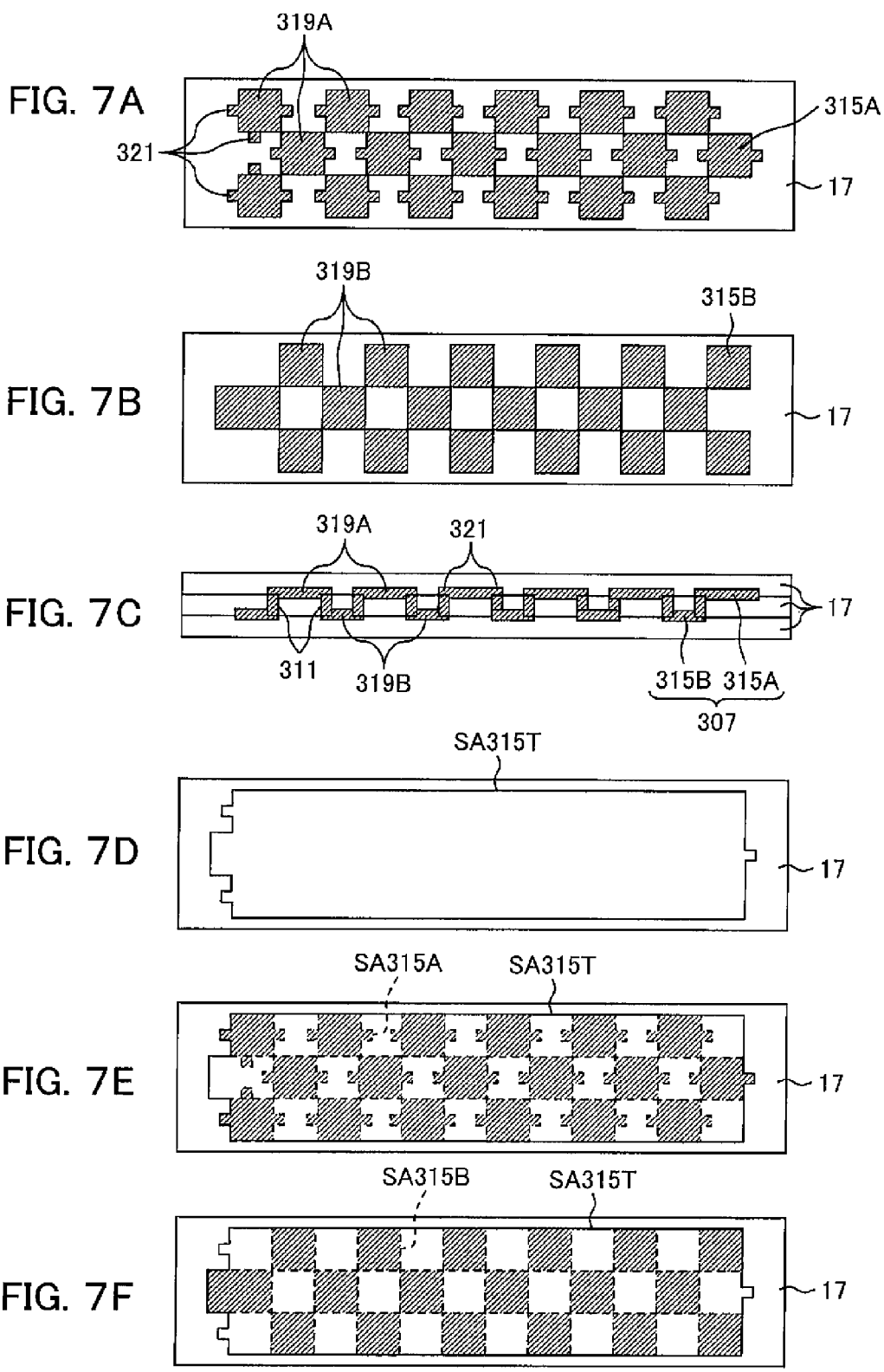

PLASMA GENERATOR AND REACTION APPARATUS

CROSS-REFERENCE TO THE RELATED APPLICATIONS

This application is a national stage of international application No. PCT/JP2008/055876, filed on Mar. 27, 2008, which also claims the benefit of priority under 35 USC 119 to Japanese Patent Application No. 2007-090847, filed on Mar. 30, 2007, the entire contents of which are incorporated herein by reference.

TECHNICAL FIELD

The present invention relates to a plasma generator and a reaction apparatus using discharge to generate plasma.

BACKGROUND ART

As a plasma generator using discharge to generate plasma, a configuration having electrodes buried in an insulating base member is known (see, for example, Patent Literature 1). The insulating base member is formed by, for example, a ceramic, and the electrodes are formed by, for example, a metal.

Such a plasma generator rises in temperature along with generation of the plasma. Further, a plasma generator is sometimes used under an environment where temperature changes are vigorous. For example, a plasma reactor breaking down NOx or SOx by using plasma is sometimes used in the vicinity of an engine of a car or in an exhaust gas pipe of an incinerator or in another environment where abrupt temperature changes (for example, a temperature change of 0 to 800° C.) occurs.

Patent Document 1: Japanese Patent Publication (A) No. 2002-221027

DISCLOSURE OF THE INVENTION

Problem to be Solved by the Invention

However, when used under an environment where temperature changes are vigorous as explained above, thermal stress occurs due to a heat expansion difference between the insulating base member and the electrodes. For example, when the heat expansion of the electrodes is larger than the heat expansion of the insulating base member, the expansion of the electrodes will be restrained by the insulating base member, so a compression load will be applied to the electrodes and a tensile load with the same magnitude as that of the compression load which is applied to the electrode will be applied to the insulating base member. Further, for example, when the tensile load applied to the insulating base member exceeds a predetermined magnitude, damage of the insulating base member sometimes occurs.

On the other hand, simply reducing the area of the entire electrodes or adopting another technique in order to suppress the thermal stress leads to a drop in the plasma generating efficiency, so is not preferred.

Accordingly, a plasma generator and a reaction apparatus capable of suppressing thermal stress occurring between an insulating base member and an electrode without lowering the plasma generating efficiency have been desired.

Means for Solving the Problem

A plasma generator of the present invention has an insulating base member provided with a discharge space and a pair of electrodes provided on the insulating base member sandwiching the discharge space therebetween. At least one electrode of the pair of electrodes has a plurality of electrode layers provided at positions different from each other in a facing direction of the pair of electrodes.

A reaction apparatus of the present invention has the plasma generator, a feed part which can feed a treated fluid into the discharge space, and an electrode control part which can apply voltage to the electrodes. The electrode control part can apply voltage to the electrodes so as to generate plasma in the discharge spaces and cause a chemical change of the treated fluid.

BRIEF DESCRIPTION OF THE DRAWINGS

FIG. 2 A diagram schematically showing a cross-section taken along a II-II line of FIG. 1.

FIG. 6 A diagram explaining a second embodiment of the present invention.

FIG. 7 A diagram explaining a third embodiment of the present invention.

BEST MODE FOR CARRYING OUT THE INVENTION

First Embodiment

Figure 1:
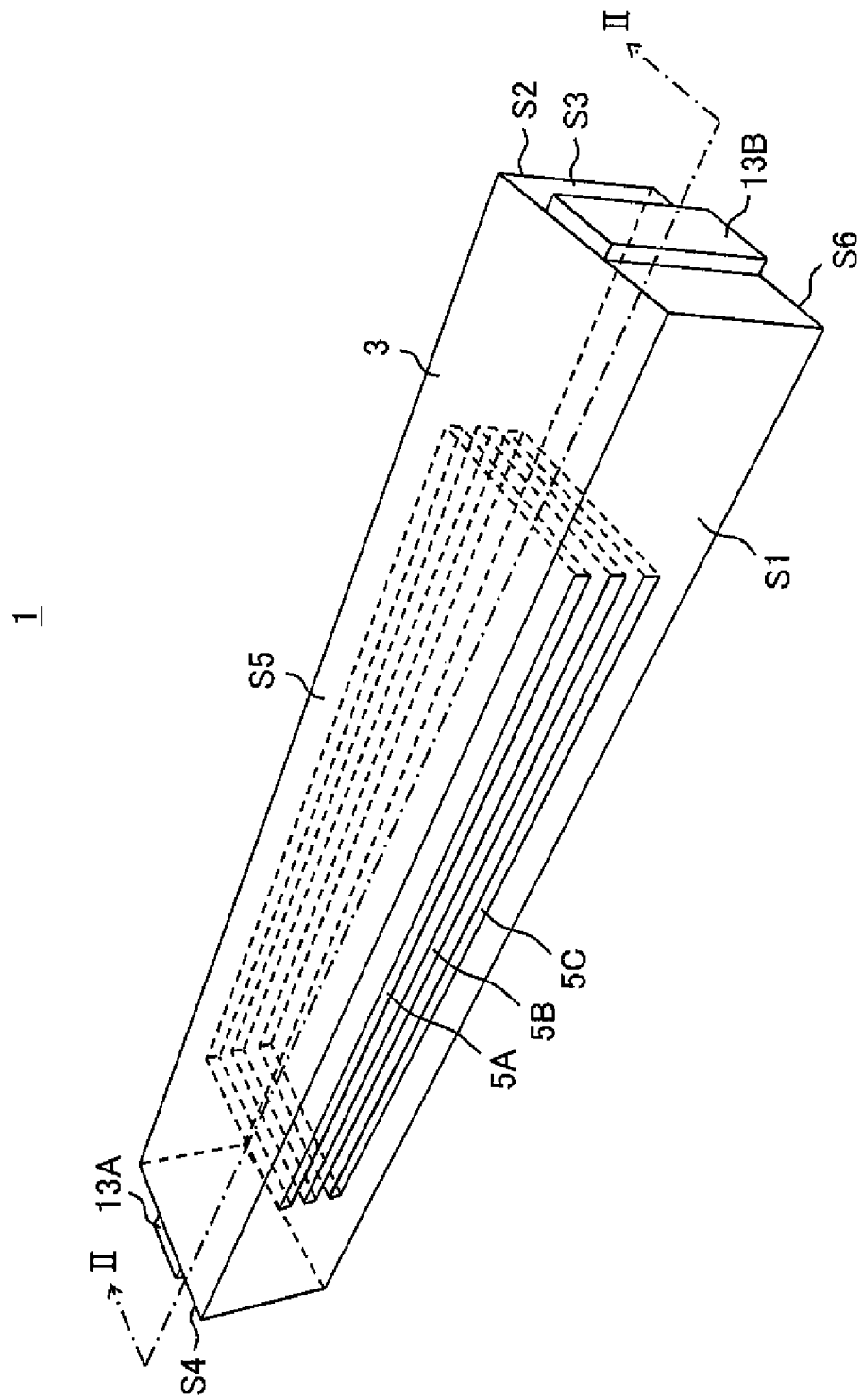
FIG. 1 A perspective view of an appearance of a plasma generator according to a first embodiment of the present invention.

As shown in FIG. 1 and FIG. 2, a plasma generator 1 is provided with a base member 3 where first to third discharge spaces 5A to 5C (hereinafter, simply referred to as the "discharge spaces 5", these sometimes not differentiated) are formed and first to fourth electrodes 7A to 7D (FIG. 2) performing discharge in the discharge spaces 5 for plasma generation.

The base member 3 is formed in, for example, a long rectangular parallelepiped shape and has a first surface S1 and a second surface S2 which face each other, a third surface 83 and a fourth surface S4 which perpendicularly intersect the first surface S1 and second surface S2 and face each other, and a fifth surface S5 and a sixth surface S6 which perpendicularly intersect the first to fourth surfaces S1 to S4 and face each other.

The base member 3 is, for example, integrally formed. Namely, the base member 3 as a whole is formed by the same material and is formed as a single member and does not have interfaces. In other words, the base member 3 is not formed by fastening a plurality of members to each other by a binder, screws, or engagement parts. However, the base member 3 may also be configured by combining a plurality of members.

The base member 3 is comprised of an insulator (also referred to as a "dielectric" or a "nonconductor"). For example, the base member 3 is comprised of a ceramic. The ceramic is, for example, an aluminum oxide sintered body, a mullite sintered body, an aluminum nitride sintered body, or a silicon carbide sintered body.

The discharge spaces 5 are formed in, for example, tunnel shapes opening at the first surface S1 and the second surface S2. In other words, the discharge spaces 5 are spaces surrounded in four directions (directions facing the third to sixth surfaces S3 to S6) and opened in two directions. The discharge spaces 5 are formed in, for example, thin rectangular parallelepiped shapes. Note that, hereinafter, a direction over which the first surface S1 and the second surface S2 face each other will be sometimes referred to as a through direction of the discharge spaces 5, a direction over which the third surface S3 and the fourth surface S4 face each other will be sometimes referred to as a width direction of the discharge spaces 5, and a direction over which the fifth surface S5 and the sixth surface S6 face each other will be sometimes referred to as a thickness direction of the discharge spaces 5.

A plurality of discharge spaces 5 are, for example, provided. The present embodiment illustrates a case where three discharge spaces 5 are provided. The plurality of discharge spaces 5 are formed in, for example, the same shape as each other. Further, the plurality of discharge spaces 5 are aligned in a predetermined direction. Specifically, the plurality of discharge spaces 5 are aligned in the thickness direction and arranged parallel to the through direction. The plurality of discharge spaces 5 are arranged at, for example, equal intervals.

A plurality of electrodes 7 are configured by so-called capacitor type electrodes. Namely, the plurality of electrodes 7 are arranged to face each other sandwiching the discharge spaces 5 between them. Then, due to a potential difference of two electrodes 7 arranged to face each other sandwiching a discharge space 5 therebetween, discharge is carried out in that sandwiched discharge space 5, and plasma is generated. The discharge is so-called high frequency discharge which is carried out by applying an AC voltage having a relatively high frequency to a pair of electrodes 7. The frequency of the applied AC voltage is, for example, 1 kHz to 100 MHz.

The plurality of electrodes 7 are alternately arranged with respect to the plurality of discharge spaces 5 in the alignment direction of the plurality of discharge spaces 5. Accordingly, an electrode 7 sandwiched by two discharge spaces 5 functions as an electrode performing discharge in one discharge space 5 and functions also as an electrode performing discharge in the other discharge space 5. An electrode 7 sandwiched by two discharge spaces 5 is arranged at, for example, the center of two discharge spaces 5. A plurality of electrodes 7 are arranged at, for example, equal intervals.

Specifically, these are arranged in a sequence of the first electrode 7A, first discharge space 5A, second electrode 7B, second discharge space 5B, third electrode 7C, third discharge space 5C, and fourth electrode 7D. The first electrode 7A and second electrode 7B constitute a first pair of electrodes 9A performing discharge in the first discharge space 5A, the second electrode 7B and third electrode 7C constitute a second pair of electrodes 9B performing discharge in the second discharge space 5B, and the third electrode 7C and fourth electrode 7D constitute a first pair of electrodes 9C performing discharge in the third discharge space 5C (hereinafter, simply referred to as the "pairs of electrodes 9", the first to third pairs of electrodes 9A to 9C sometimes not differentiated.).

Each of the plurality of electrodes 7 is connected to every other electrode 7 in their alignment direction. Specifically, the first electrode 7A and the third electrode 7C are connected, and the second electrode 7B and the fourth electrode 7D are connected.

Note that, the connection of the first electrode 7A and the third electrode 7C is made by, for example, a first connection conductor 11A buried in the base member 3, and the connection of the second electrode 7B and the fourth electrode 7D is made by, for example, a second connection conductor 11B buried in the base member 3 (hereinafter, simply referred to as the "connection conductors 11", the first and second connection conductors 11A and 11B sometimes not differentiated). Note that the first electrode 7A and the third electrode 7C are connected to each other by a first terminal 13A which will be explained later, and the second electrode 7B and the fourth electrode 7D are connected to each other by a second terminal 13B which will be explained later, therefore the connection conductors 11 may be omitted.

The electrodes 7 are buried in the base member 3. Namely, the surfaces facing each other and their back surfaces and side surfaces are covered by the base member 3. By covering the electrodes 7 by the base member 3 in this way, inflow of electrons into the electrodes 7 is eased, therefore the amount of electrons increases from one of the facing electrodes 7 toward the other electrode 7, and polarities of electrodes are inverted before growth to an arc discharge. Namely, by covering the electrodes 7 by the base member 3, breakage due to the arc discharge can be suppressed, and discharging can be maintained.

The electrodes 7 and the connection conductors 11 are comprised of, for example, metals or comprised of metals as principal ingredients. The metals are, for example, molybdenum or tungsten. These metals have relatively small heat expansion coefficients and have small heat expansion differences from those of ceramics and other insulating materials, so are preferred for suppression of damage of the plasma generator 1 due to thermal stress.

The plasma generator 1 has first and second terminals 13A and 13B (hereinafter, simply referred to as the "terminals 13", these sometimes not differentiated) for applying voltages to the pairs of electrodes 9. The first terminal 13A is provided on, for example, the fourth surface S4 of the base member 3, and the second terminal 13B is provided on, for example, the third surface S3 of the base member 3. The terminals 13 are constituted by, for example, flat sheets of metal which are arranged along the third surface S3 and fourth surface S4. The first terminal 13A is connected to the first electrode 7A and the third electrode 7C, and the second terminal 13B is connected to the second electrode 7B and the fourth electrode 7D.

In the plasma generator 1 having the configuration described above, the base member 3 is formed by, for example, stacking ceramic green sheets or other insulating layers (dielectric layers) and sintering these. Namely, the base member 3 is constituted by a laminate of insulating layers. The electrodes 7 and connection conductors 11 are formed by, for example, arranging a conductive paste on the insulating layers before sintering and sintering it together with the stacked insulating layers whereby this is buried and fixed in the base member 3. The discharge spaces 5 are formed by, for example, providing empty places in portions of the plurality of insulating layers before sintering. Specifically, this is as exemplified below.

For example, when the base member 3 is made of an aluminum oxide sintered body, this is fabricated by mixing an organic binder, organic solvent, or the like with alumina ($Al_2O_3$), silica ($SiO_2$), calcia (CaO), magnesia (MgO), or another material powder to form a ceramic slurry, forming this into a sheet shape at a front surface portion of a support member by employing a conventionally known doctor blade method or calendar roll method so as to obtain a ceramic green sheet, then suitably punching the ceramic green sheet, stacking a plurality of sheets according to need, and firing the stack at a high temperature (about 1300 to 1800° C.).

As the organic binder used for the ceramics slurry, a proven binder being used for green sheets may be used. For example, there can be mentioned an acryl (acrylate, methacrylate, or homopolymer or copolymer of esters of those, specifically an acrylate ester copolymer, a methacrylate ester copolymer, an acrylate ester-methacrylate ester copolymer, etc.), a polyvinyl butyral, a polyvinyl alcohol, an acryl styrene, a polypropylene carbonate, or a cellulose, or other homopolymer or copolymer. When considering decomposition and volatility in the firing process, an acrylic binder is more preferred.

As the solvent used for the ceramic slurry, one able to disperse and mix the above-described ceramic powder and organic binder well may be employed. There can be mentioned an organic solvent of toluene, ketones, or alcohols or water. Among those, a solvent having a high evaporation coefficient such as toluene, methyl ethyl ketone, or isopropyl alcohol is preferred since a drying process after coating the slurry can be executed in a short time.

A conductive paste to be arranged between insulating layers and become the electrodes 7 etc. is printed to predetermined shapes at predetermined positions of the ceramic green sheets before stacking by using screen printing or another technique. The electrodes prepared by such a method are excellent in flatness and smoothness, so electrodes having a thin thickness can be formed.

A conductive paste to become the connection conductors 11 etc. and penetrating through the insulating layers is buried in holes formed at predetermined positions of the ceramic green sheets before stacking by punching, laser, or the like by using a technique of buried printing or the like.

The conductor paste is fabricated by adding an organic binder, an organic solvent, and, according to need, a dispersant to a metal powder of the principal ingredient and mixing and kneading these by a ball mill, triple roll mill, planetary mixer, or other kneading means. A glass or ceramic powder may be incorporated as well in order to match the sintering behavior of the ceramic green sheet and raise a joint strength with an insulating base plate after sintering.

As the conductive material used for the conductor paste, there can be mentioned, for example, tungsten or molybdenum. That conductive material is a powder produced by an atomization method or reduction method. Oxidation may be suppressed, agglomeration may be suppressed, or other treatment may be carried out as well according to need. Classification or the like may also be used to remove fine powder or coarse powder from the conductive powder to adjusting the distribution of particle size.

As the organic binder used for the conductor paste, a proven binder being used for the conductor paste may be used. As the organic binder, there can be mentioned, for example, an acryl, a polyvinyl butyral, a polyvinyl alcohol, an acryl styrene, a polypropylene carbonate, a cellulose, or other homopolymer or copolymer. As the acrylic polymer, there can be mentioned acrylate, methacrylate, or a homopolymer or copolymer of esters of the same, specifically, an acrylate ester copolymer, methacrylate ester copolymer, acrylate-ester/methacrylate ester copolymer, etc. When considering decomposition and volatility in the firing process, an acrylic or alkyd organic binder is more preferred. The amount of addition of the organic binder differs according to the conductor particles. However, it only has to be an amount large enough to disperse conductor particles without causing a problem in the decomposition property of the organic binder.

The organic solvent used for the conductor paste only has to be one capable of dispersing and mixing the above conductor powder and organic binder well. Terpineol, butyl carbitol acetate, phthalic acid, or another plasticizer can be used. Nevertheless, by considering the drying property of the solvent after forming the electrodes 7, terpineol or another low boiling point solvent is preferred.

FIG. 3 is a diagram explaining the gist of the present embodiment.

Figure 3A:
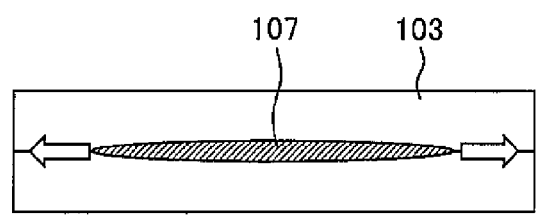
FIG. 3 A diagram explaining a gist of the first embodiment of the present invention.

FIG. 3(a) shows a cross-sectional view of a portion of a base member 103 of the plasma generator as a comparative example. In this plasma generator, an electrode 107 having a relatively wide area is buried in the base member 103. Accordingly, the load applied to the base member 103 by the electrode 107 due to a heat expansion difference is big.

Figure 3B:
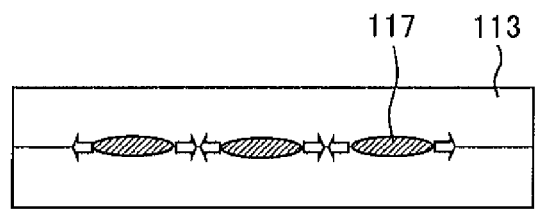

FIG. 3(b) shows a cross-sectional view of a portion of a base member 113 of the plasma generator as another comparative example. In this plasma generator, a plurality of partial electrodes 117 obtained by dividing the electrode 107 of FIG. 3(a) are buried in the base member 113. Accordingly, in comparison with FIG. 3(a), the load applied to the base member 113 due to the heat expansion difference is small.

However, there is clearance between the plurality of partial electrodes 117, therefore the area of the plurality of partial electrodes 117 as a whole becomes smaller in comparison with the area of the electrode 107 of FIG. 3(a), so the efficiency of generation of plasma is lowered.

Figure 3C:
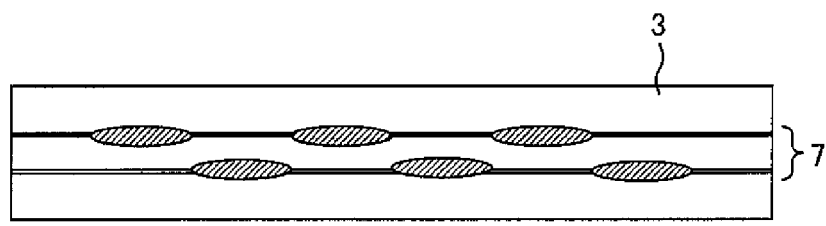

Therefore, in the present embodiment, as shown in FIG. 3(c), by giving a multi-layer structure to the electrode 7, the area of the electrode in each layer is made smaller, and the area of the electrode in the entire plurality of layers is made larger, so the efficiency of generation of plasma is improved while making the load applied to the base member 3 by the electrode 7 due to the heat expansion difference smaller.

Figure 4:
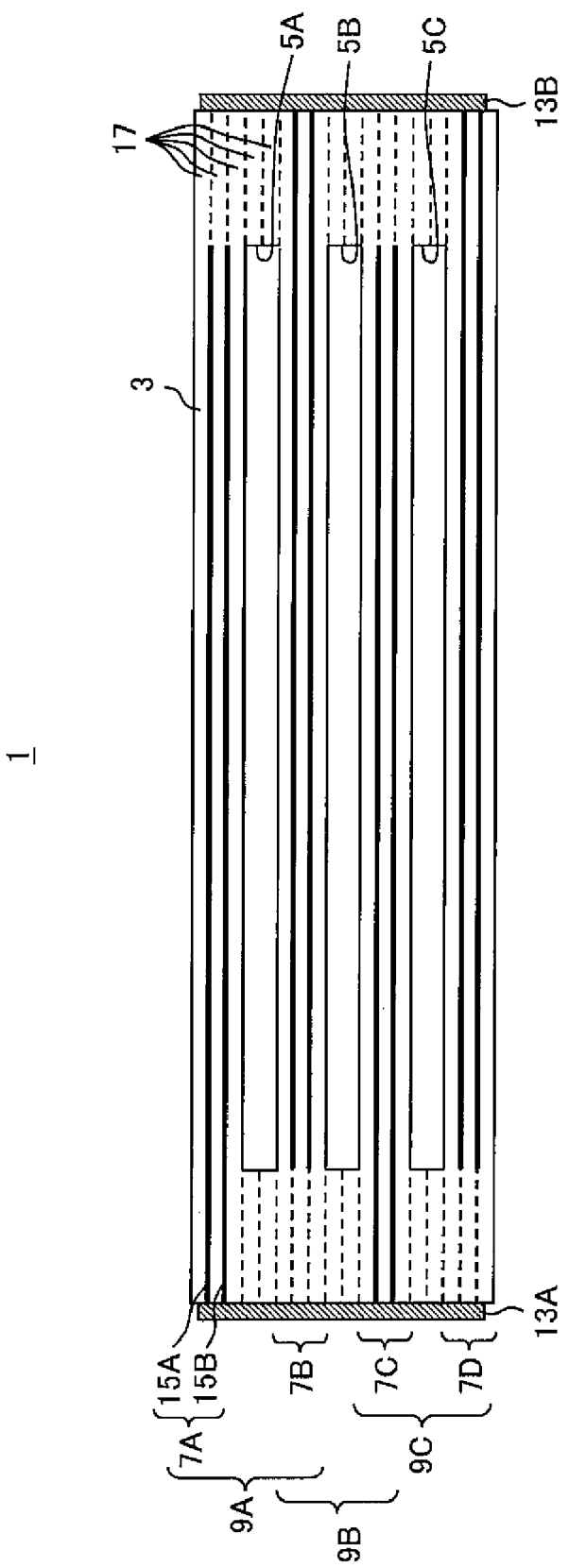
FIG. 4 A diagram showing the cross-section shown in FIG. 2 in more detail.

FIG. 4 is a cross-sectional view showing the cross-sectional view shown in FIG. 2 in more detail. Note, in FIG. 4, the connection conductors 11 are omitted.

Each electrode 7 has a first electrode layer 15A and a second electrode layer 15B (hereinafter, simply referred to as the "electrode layers 15", these sometimes not differentiated.). Namely, each electrode 7 has a plurality of (two in the present embodiment) electrode layers 15. The plurality of electrode layers 15 of each electrode 7 are arranged at positions different from each other in the direction over which the pair of electrodes 9 face each other. The plurality of electrode layers 15 of each electrode 7 are, for example, arranged in parallel. The plurality of electrode layers 15 of each electrode 7 are electrically connected to each other. For example, these are electrically connected to each other by the terminal 13. Note that, the plurality of electrode layers 15 of each electrode 7 may be connected by the connection conductors 11 shown in FIG. 2 as well.

The plurality of electrode layers 15 are, for example, arranged between the plurality of insulating layers 17 constituting the base member 3. Due to this, they are buried in the base member 3 and are arranged at positions different from each other in the direction over which the pair of electrodes 9 face each other. FIG. 4 illustrates a case where the entire base member 3 is constituted by 18 insulating layers 17 and where the first electrode layer 15A and second electrode layer 15B of each electrode 7 are arranged between three insulating layers 17. The first electrode layer 15A and second electrode layer 15B of each electrode 7 are arranged to sandwich one of the insulating layers 17. The electrode layers 15 are formed as explained above by, for example, arranging a conductive paste on the insulating layer 17 before firing and firing this together with the stacked plurality of insulating layers 17, whereby they are buried and fixed in the base member 3.

Note that, FIG. 4 illustrates a case where the thicknesses of the plurality of insulating layers 17 are the same as each other. Note, the plurality of insulating layers 17 may have thicknesses different from each other as well. Further, FIG. 4 illustrates a case where the discharge spaces 5 are formed by formation of empty places of two insulating layers 17.

FIG. 5 is a diagram explaining the shape of the electrode layers 15 of an electrode 7. FIG. 5(a) is a sectional view showing one electrode 7. Namely, this is a diagram showing a portion of FIG. 4. FIG. 5(b) is a plan view showing the first electrode layer 15A. FIG. 5(c) is a plan view showing the second electrode layer 15B. Note that, the plan view is the diagram seen in the direction over which the pair of electrodes 9 face each other. Further, FIG. 5(d) is a diagram explaining a projection area SA15T of the entire first electrode layer 15A and second electrode layer 15B in the direction over which the pair of electrodes 9 face each other. FIG. 5(e) is a diagram explaining a projection area SA15A of the first electrode layer 15A in the direction over which the pair of electrodes 9 face each other. FIG. 5(f) is a diagram explaining a projection area SA15B of the second electrode layer 15B in the direction over which the pair of electrodes 9 face each other.

Figure 5A:
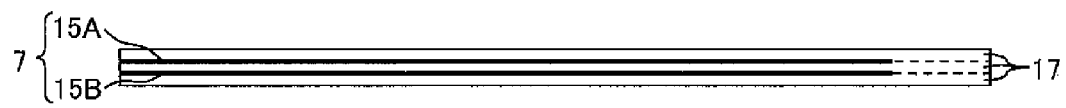
FIG. 5 A diagram explaining a shape of an electrode layer of the plasma generator of FIG. 1.
Figure 5B:
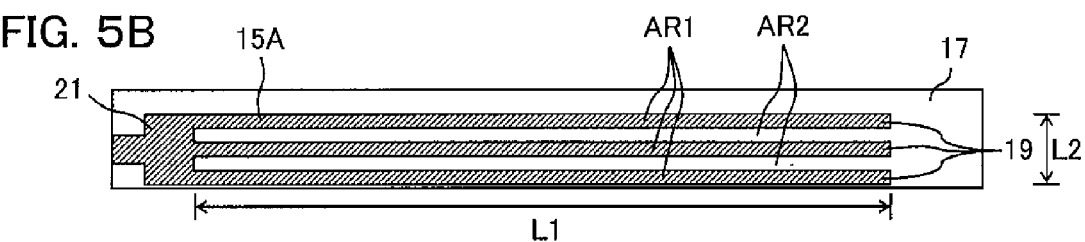
Figure 5C:
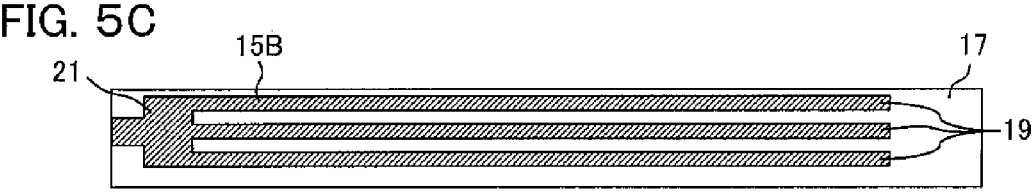
Figure 5D:
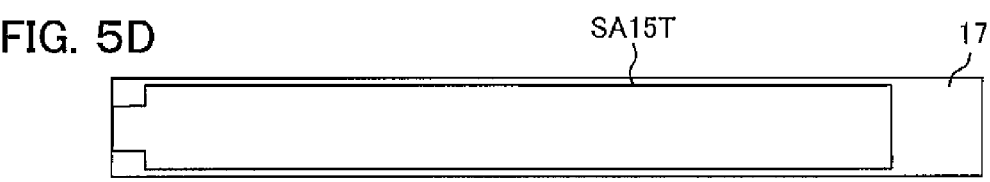
Figure 5E:
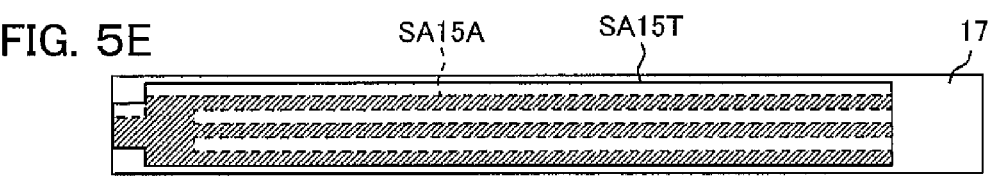
Figure 5F:
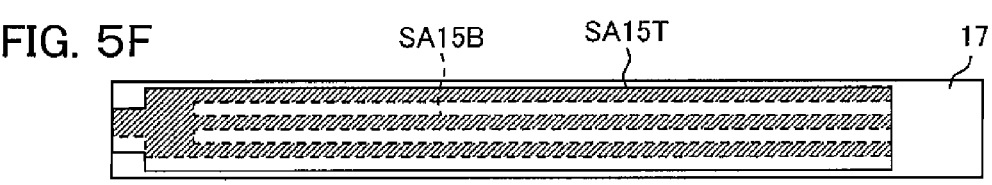

As shown in FIG. 5(b) and FIG. 5(c), the first electrode layer 15A is generally located at a position where the second electrode layer 15B is not arranged, and the second electrode layer 15B is generally located at the position where the first electrode layer 15A is not arranged. Accordingly, as shown in FIG. 5(d) to FIG. 5(f), the projection area SA15T of the entire first electrode layer 15A and second electrode layer 15B in the direction over which the pair of electrodes 9 face each other is larger than the projection area SA15A or SA15B of each electrode layer 15 in the direction over which the pair of electrodes 9 face each other. Namely, the projection area SA15T of the plurality of electrode layers 15 in the direction over which the pair of electrodes 9 face each other is larger than the projection area SA15A or SA15B of each electrode layer 15 in the direction over which the pair of electrodes 9 face each other. Specifically, this is as follows.

Each electrode layer 15 is for example formed in a long shape long in a predetermined direction (for example, in the width direction of the discharge spaces 5, i.e. left/right direction in FIG. 5) as a whole. Each electrode layer 15 has a plurality of (three electrodes are exemplified in FIG. 5(b) and FIG. 5(c)) partial electrodes 19 which are aligned in one direction (for example, a direction wherein the electrode layer 15 is short, i.e., up/down direction in FIG. 5(b) and FIG. 5(c)) among the directions along the insulating layer 17 (direction perpendicular to the direction over which the pair of electrodes 9 face each other) with a space from each other at the position where these overlap the discharge spaces 5.

The plurality of partial electrodes 19 are long shapes long in, for example, a longitudinal direction of the electrode layer 15. The plurality of partial electrodes 19 have, for example, the same sizes as each other. The pitch of the plurality of partial electrodes 19 (width of the position where no electrode is arranged) is for example schematically the same as or slightly smaller than the width of the partial electrodes 19 (the length in the up/down direction of FIG. 5(b) and FIG. 5(c) and length in the alignment direction of the plurality of partial electrodes 19). Further, when seen in the direction over which the pairs of electrodes 9 face each other, the plurality of partial electrodes 19 of the first electrode layer 15A are located between the plurality of partial electrodes 19 of the second electrode layer 15B, and the plurality of partial electrodes 19 of the second electrode layer 15B are located between the plurality of partial electrodes 19 of the first electrode layer 15A.

The plurality of partial electrodes 19 are electrically connected to each other. For example, the plurality of partial electrodes 19 are connected to each other in each electrode layer 15 by a connection part 21 provided in each electrode layer 15. Further, by connection of connection parts 21 of electrode layers 15 to each other, the plurality of partial electrodes 19 of different electrode layers 15 are connected to each other. Note that, mutual connection of connection parts 21 is carried out by at least one of the terminals and the connection conductors 11 explained above.

The connection part 21 is, for example, formed between insulating layers 17 in the same way as the partial electrodes 19 and constitutes a portion of the electrode layer 15. The connection part 21, for example, connects the plurality of partial electrodes 19 in each electrode layer 15 at end portions of the plurality of partial electrodes 19 in the direction perpendicular to the alignment direction of the partial electrodes 19. Accordingly, the electrode layer 15 is formed in a comb tooth shape as a whole. The connection part 21 is arranged at a position where it does not overlap the discharge space 5 when seen in the direction over which the pair of electrodes 9 face each other. However, the connection part 21 may be provided at a position where it overlaps the discharge space 5 as well.

According to the above embodiment, the generator has the base member 3, as an insulating base member, whereupon discharge spaces 5 are formed and pairs of electrodes 9 provided in that base member 3 sandwiching the discharge spaces 5 therebetween. The electrode 7 of each pair of electrodes 9 has a plurality of electrode layers 15 which are provided at positions different from each other in the direction over which the pair of electrodes 9 face each other and are electrically connected to each other. The plurality of electrode layers 15 are arranged so that the projection area SA15T of these plurality of electrode layers 15 in the direction over which the pair of electrodes 9 face each other becomes larger than the projection area SA15A or SA15B of each electrode layer 15 in the direction over which the pair of electrodes 9 face each other, therefore the area of each electrode layer 15 can be made smaller relative to the electrode area contributing to the plasma generation, and the load applied to the base member 3 by the electrode layers 15 due to the heat expansion difference can be made smaller without lowering the efficiency of generation of plasma.

Each electrode layer 15 has a plurality of partial electrodes 19 at least a portion of which are located at different positions in the plane perpendicularly intersecting the direction over which the pair of electrodes 9 face each other. Therefore, in each layer as well, the load applied to the base member 3 is dispersed, so the damage of the plasma generator 1 is further suppressed.

Specifically, each electrode layer 15 has a plurality of partial electrodes 19 which are arranged at spaces from each other in a predetermined direction perpendicular to the direction over which the pair of electrodes 9 face each other (in the direction where the electrode layer 15 is shorter in the present embodiment), and the plurality of partial electrodes 19 of each electrode layer 15 are arranged so that these are located between a plurality of partial electrodes 19 of another electrode layer 15 when seen in the direction over which the pair of electrodes 9 face each other. Therefore, by a simple configuration, a drop in the plasma generating efficiency is suppressed while making the length of partial electrodes 19 in the predetermined direction shorter.

The plurality of partial electrodes 19 are formed in a long shape long in the direction perpendicular to the direction over which the pair of electrodes 9 face each other and the alignment direction of the plurality of partial electrodes 19, therefore these are arranged without problem with respect to the long discharge spaces 5 and can generate plasma.

The base member 3 is a laminate of a plurality of insulating layers 17. The plurality of electrode layers 15 are provided between a plurality of insulating layers 17. Therefore, by forming the electrodes 5 in the insulating layers 17 before stacking, electrodes having a multi-layer structure are easily realized.

Second Embodiment

FIG. 6 is a diagram explaining a second embodiment. FIG. 6(a) is a plan view of a first electrode layer 215A. FIG. 6(b) is a plan view of a second electrode layer 215B. FIG. 6(c) is a diagram explaining a projection area SA215T of the entire first electrode layer 215A and second electrode layer 215B in the direction over which the pair of electrodes face each other (see the pair of electrodes 9 of FIG. 4). FIG. 6(d) is a diagram explaining a projection area SA215A of the first electrode layer 215A in the direction over which the pair of electrodes face each other. FIG. 6(e) is a diagram explaining a projection area SA215B of the second electrode layer 215B in the direction over which the pair of electrodes face each other.

The first electrode layer 215A and the second electrode layer 215B, (hereinafter, simply referred to as the "electrode layers 215", the two sometimes not differentiated) correspond to the first electrode layer 15A and the second electrode layer 15B of the first embodiment. However, the electrode layers 215 differ in the shape from the electrode layers 15.

Each electrode layer 215, in the same way as the electrode layers 15 of the first embodiment, has a plurality of partial electrodes 219. The plurality of partial electrodes 219 are aligned in a plurality of rows (for example, two rows) when defining, as a row, partial electrodes aligned in a predetermined direction (for example, the longitudinal direction of the electrode layer 215, i.e., left/right direction in FIG. 6) when seen in the direction over which the pair of electrodes (see the pair of electrodes 9 in FIG. 4) face each other (the through direction on the sheet surface of FIG. 6).

In each row, the plurality of partial electrodes 219 are arranged spaced apart from each other. The plurality of partial electrodes 219 of each row are arranged so that these are located between the plurality of partial electrodes 219 in an adjacent row. The regions between the plurality of partial electrodes 219 in each row (region where electrodes are not arranged) are formed slightly smaller than the areas of the partial electrodes 219. Note that, the areas of the non-arrangement regions may be equivalent to the areas of the partial electrodes 219 as well. The partial electrodes 219 are formed to, for example, rectangles (for example, perfect squares) having parallel sides in the arrangement directions of the plurality of partial electrodes 219 (left/right direction and up/down direction in FIG. 6).

The plurality of partial electrodes 219 of each electrode layer 215 are arranged so that these are located between a plurality of partial electrodes 219 of another electrode layer 215 when seen in the direction over which the pair of electrodes face each other. Accordingly, in the second embodiment as well, the projection area SA215T of the plurality of electrode layers 215 in the direction over which the pair of electrodes face each other is larger than the projection area SA215A or SA215B of each electrode layer 215 in the direction over which the pair of electrodes face each other.

The plurality of partial electrodes 219 are electrically connected to each other. For example, the plurality of partial electrodes 19 are connected to each other in each electrode layer 215. Further, by mutual connection of the connection parts 221 of the electrode layers 215, the plurality of partial electrodes 219 of different electrode layers 215 are connected to each other. Specifically, this is as follows.

The plurality of partial electrodes 219 are connected to each other by, for example, a connection of each partial electrode 219 of each row with the partial electrodes 219 of the adjacent row at the two sides in the direction along the rows (left/right direction in FIG. 6) at the corner parts of the rectangles. Parts forming the corner parts of the rectangles of the plurality of partial electrodes 219 are arranged at positions common to each other because the pitch of the plurality of partial electrodes 219 becomes smaller than the sides of the rectangles. The plurality of partial electrodes 219 are connected by sharing the parts becoming the corner parts.

A connection part 221 is connected to the partial electrode 219 arranged at the end portion in the direction along the rows (left/right direction in FIG. 6). Further, the connection part 221 of each electrode layer 215 is arranged at a position where at least a portion thereof is superimposed on another electrode layer 215. Then, by a conductor penetrating through the insulating layer 17 like in the connection conductor 11 shown in FIG. 2, the connection parts 221 of electrode layers 215 are connected to each other. Note that, the connection parts 221 may be connected to each other by the terminal 13 shown in FIG. 4 in the same way as the first embodiment by extension up to the end portion of the insulating layer 17 as well.

According to the second embodiment described above, each electrode layer 215 has a plurality of partial electrodes 219 arranged in a plurality of rows when seen in the direction over which the pair of electrodes face each other, and the plurality of partial electrodes 219 of each row are arranged spaced apart from each other and are arranged so that each is located between the plurality of partial electrodes 219 in the adjacent row. The plurality of partial electrodes 219 of each electrode layer 215 are arranged so that each is located between the plurality of partial electrodes 219 of another electrode layer 215 when seen in the direction over which the pair of electrodes face each other. Therefore, in addition to the same effects as those of the first embodiment, the length of the partial electrodes 219 can be reduced in two directions (up/down direction and left/right direction in FIG. 6). As a result, the damage of the base member 3 is more effectively suppressed.

Each partial electrode 219 is formed to a rectangle having sides parallel to the rows and sides perpendicular to the rows, therefore a configuration where each electrode layer 215 is divided in two directions, and a plurality of partial electrodes 219 are arranged in the plurality of electrode layers 215 without clearance is realized by a simple configuration.

Third Embodiment

FIG. 7 is a diagram explaining a third embodiment. FIG. 7(a) is a plan view of a first electrode layer 315A. FIG. 7(b) is a plan view of a second electrode layer 315B. FIG. 7(c) is a sectional view of an electrode 307 constituted by the first electrode layer 315A and the second electrode layer 315B. FIG. 7(d) is a diagram explaining a projection area SA315T of the entire first electrode layer 315A and second electrode layer 315B in the direction over which the pair of electrodes face each other (see the pair of electrodes 9 of FIG. 4). FIG. 7(e) is a diagram explaining a projection area SA315A of the first electrode layer 315A in the direction over which the pair of electrodes face each other. FIG. 7(f) is a diagram explaining a projection area SA315B of the second electrode layer 315B in the direction over which the pair of electrodes face each other.

The first electrode layer 315A and second electrode layer 315B (hereinafter, simply referred to as the "electrode layers 315", these sometimes not differentiated) correspond to the first electrode layer 15A and second electrode layer 15B of the first embodiment or the first electrode layer 215A and second electrode layer 215B of the second embodiment. Further, in the same way as the first and second embodiments, the first electrode layer 315A has a plurality of first partial electrodes 319A, and the second electrode layer 315B has a plurality of second partial electrodes 319B (hereinafter, simply referred to as the "partial electrodes 319", the first partial electrode 319A and second partial electrode 319B sometimes not differentiated).

The plurality of partial electrodes 319, in the same way as the second embodiment, are aligned in a plurality of rows (for example, three rows) when seen in the direction over which the pair of electrodes (see the pair of electrodes 9 of FIG. 4) face each other (the through direction of the sheet surface of FIG. 7(a) and FIG. 7(b)), are arranged so that they are spaced apart from each other in each row, and are arranged so that each is located between the plurality of partial electrodes 319 in the adjacent row. Further, the plurality of partial electrodes 319 of each electrode layer 315 are arranged so that each is located between two of the plurality of partial electrodes 319 of another electrode layer 315 when seen in the direction over which the pair of electrodes face each other. Further, the general shape of each partial electrode 319 is a rectangle (for example, a perfect square) having sides parallel to the rows and sides perpendicular to the rows in the same way as the second embodiment.

However, in the first embodiment and second embodiment, a plurality of partial electrodes were directly connected to each other in each layer. In contrast to this, in the third embodiment, the plurality of partial electrodes 319 are not directly connected to each other in each layer. Specifically, this is as follows.

As shown in FIG. 7(a) and FIG. 7(b), the plurality of partial electrodes 319 are not integrally formed, but are formed by members separate from each other. Further, the plurality of partial electrodes 319 are set so that pitches in the direction parallel to the rows and in the direction perpendicular to the rows are the same as the lengths of the sides of the partial electrodes 319 parallel to the rows and the lengths of the sides perpendicular to the rows, so these are not superimposed on each other. Accordingly, in each electrode layer 315, the plurality of partial electrodes 319 are not connected to each other. Note that, the corner parts of the plurality of partial electrodes 319 may have vertexes spaced apart from each other with a very small clearance or may have vertexes contacting each other.

Each first partial electrode 319A has connection parts 321 projecting out into regions between the first partial electrodes 319A. In other words, each first partial electrode 319A has connection parts 321 projecting out to positions where it is superimposed on second partial electrodes 319B when seen in the direction over which the pair of electrodes face each other. The connection parts 321, for example, basically project out in the directions along the rows from the two sides perpendicular to the rows. Further, the connection parts 321 project out in directions perpendicular to the rows from sides parallel to the rows at part of the first partial electrodes 319A (in FIG. 7(a), the first partial electrodes 319A on the left end).

As shown in FIG. 7(c), the insulating layer 17 between the first electrode layer 315A and the second electrode layer 315B is provided with a plurality of connection conductors 311 constituted by through conductors like the connection conductors 11 explained above. The plurality of connection conductors 311 are arranged at positions where they are superimposed on the plurality of connection parts 321 of the first partial electrodes 319A and second partial electrodes 319B and connect the first partial electrodes 319A and the second partial electrodes 319B.

Accordingly, by alternate connection of the first partial electrode 319A and the second partial electrode 319B sequentially basically in the direction parallel to rows (left/right direction in FIG. 7), or partially sequentially in the direction perpendicular to rows, a plurality of first partial electrodes 319A and a plurality of second partial electrodes 319B are connected to each other. Note that, a plurality of partial electrodes 319 of each electrode layer 315 will be indirectly connected through the partial electrode 319 of another electrode layer 315.

The cross-sectional shape of the connection conductors 311 (shape seen in the direction over which the pair of electrodes face each other) is, for example, schematically the same as the planar shape of the connection parts 321 (shape seen in the direction over which the pair of electrodes face each other). In other words, the first partial electrodes 319A and the second partial electrodes 319B are superimposed on each other at only the arrangement positions of the connection conductors 311.

According to the above third embodiment, each electrode layer 315 has a plurality of partial electrodes 319 arranged distributed when seen in the direction over which the pair of electrodes face each other, and the plurality of partial electrodes 319 of each electrode layer 315 are electrically connected to each other through another electrode layer 315. Therefore, within each layer, a plurality of partial electrodes 319 are formed by members separate from each other or prevented from being superimposed on each other to thereby reliably prevent transmission of the stress between partial electrodes 319, or the partial electrodes can be effectively arranged so that the projection area of the electrode layer 315 becomes large. For example, in the second embodiment, at the center in the up/down direction in FIG. 6(a), an electrode portion extending in the left/right direction in FIG. 6(a) is formed. In the third embodiment, however, no such portion is produced. Note that, within the layer, the plurality of partial electrodes 319 may be integrally formed so that portions (for example, corner parts) are continuous as well. Even in this case, the effect that the transmission of the stress can be suppressed by minimizing these parts is exhibited.

Further, the plasma generator of the third embodiment has connection conductors 311 extending in the direction over which the pair of electrodes face each other and connecting a plurality of electrode layers 315, and a plurality of electrode layers 315 are superimposed on each other only at the arrangement positions of the connection conductors 311 when seen in the direction over which the pair of electrodes 9 face each other, therefore mutual conduction of the plurality of electrode layers 315 can be achieved while reducing the area of the plurality of partial electrodes 319 as much as possible.

Fourth Embodiment

Figure 8:
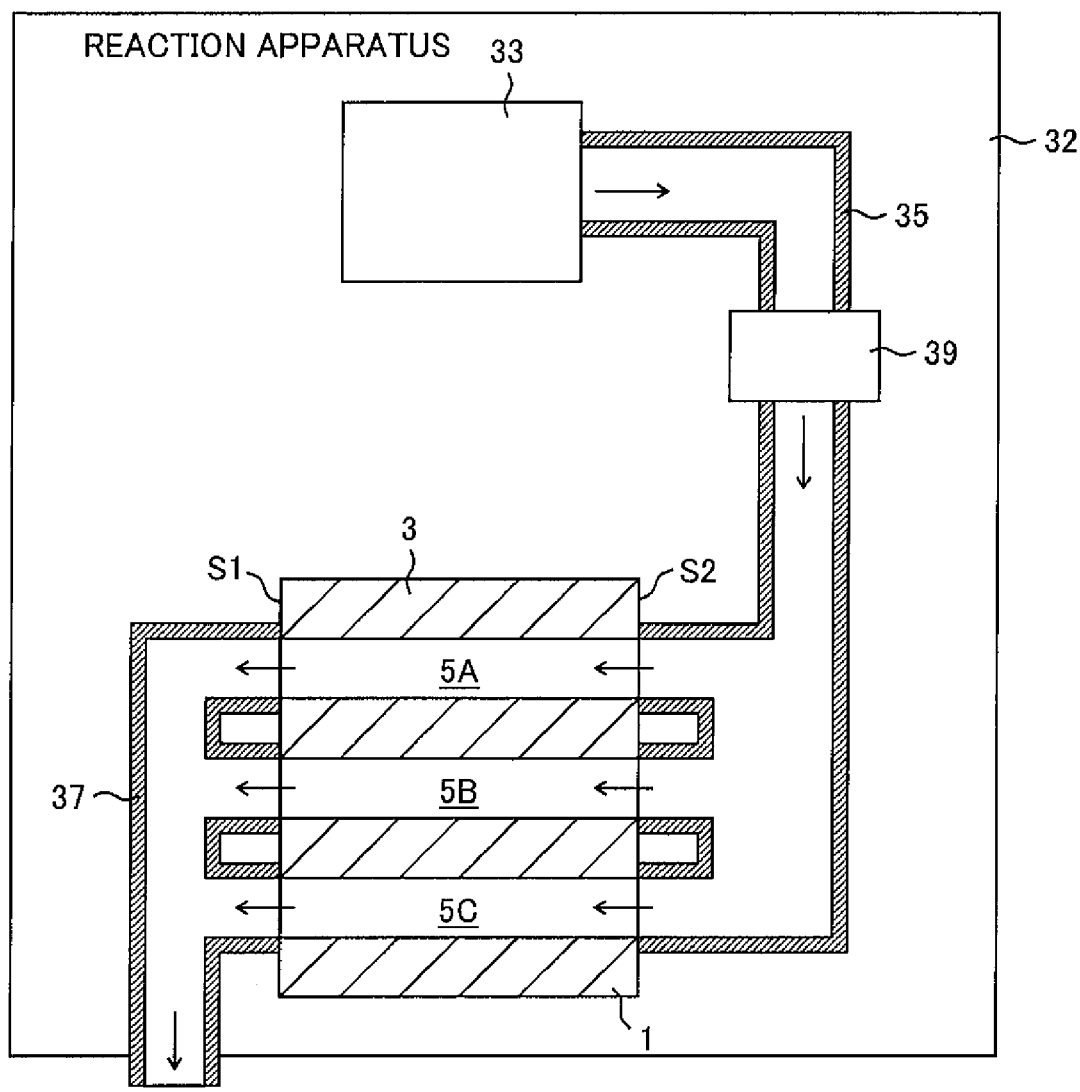
FIG. 8 A conceptual diagram showing the structural configuration of a reaction apparatus according to a fourth embodiment of the present invention.

FIG. 8 is a conceptual diagram showing the structural configuration of a reaction apparatus 31 according to a fourth embodiment of the present invention.

The reaction apparatus 31 is configured as an apparatus provided with the plasma generator 1 of the first embodiment, using the plasma generator 1 to treat the treated fluid, and discharging the result. The treated fluid is, for example, an exhaust gas of an internal combustion engine of an automobile. NOx or SOx is broken down by a chemical change in the discharge spaces 5. Further, for example, the treated fluid is a CFC used as a cooling medium in a refrigerator or air-conditioner, and the CFC is decomposed by a chemical change in the discharge spaces 5. Note that, hereinafter, in the reaction apparatus 31, the portion other than the plasma generator 1 sometimes will be referred to as the reaction apparatus body 32.

The reaction apparatus body 32 is provided with a fluid source 33 feeding the treated fluid, a feed pipe 35 (an example of the feed part) guiding the treated fluid from the fluid source 33 to the plasma generator 1, an exhaust pipe 37 exhausting the treated fluid treated by the plasma generator 1, and a treated fluid pump 39 for controlling flow of the treated fluid.

The fluid source 33 is one generating the treated fluid such as an internal combustion engine of an automobile exhausting an exhaust gas as the treated fluid. Alternatively, the fluid source 33 is one holding the treated fluid such as a tank holding a used cooling medium of a refrigerator or air conditioner.

The feed pipe 35 is linked with a space for generating or holding the treated fluid of the fluid source 33 on one end and connected with the discharge spaces 5 of the plasma generator 1 on the other end. The plasma generator 1 side of the feed pipe 35 is branched corresponding to the number of discharge spaces 5 and connected with the first discharge space 5A to the third discharge space 5C.

One end of the exhaust pipe 37 is connected with the discharge spaces 5 of the plasma generator 1 from the side opposite to the feed pipe 35, and the other end is opened to the atmosphere or connected with a not shown space for holding the treated fluid after the treatment or applying another treatment to the treated fluid after the treatment. The plasma generator 1 side of the exhaust pipe 37 is branched corresponding to the number of the discharge spaces 5 and connected with the first discharge space 5A to the third discharge space 5C. Note that, the exhaust pipe 37 may be omitted as well. For example, the treated fluid after the treatment may be directly exhausted from the discharge spaces 5 to the atmosphere.

The treated fluid pump 39 is provided at least at one of the feed pipe 35 and exhaust pipe 37. FIG. 8 illustrates a case where the pump is provided at the feed pipe 35. Note that, in a case where the fluid source 33 is an internal combustion engine or other case where the treated fluid flows by drive power of the fluid source 33, the treated fluid pump 39 may be omitted as well. Further, it is also possible to provide the treated fluid pump 39 in the plasma generator 1. The treated fluid pump 39 may be configured by a rotary pump, a reciprocating pump, or other appropriate pump.

Figure 9:
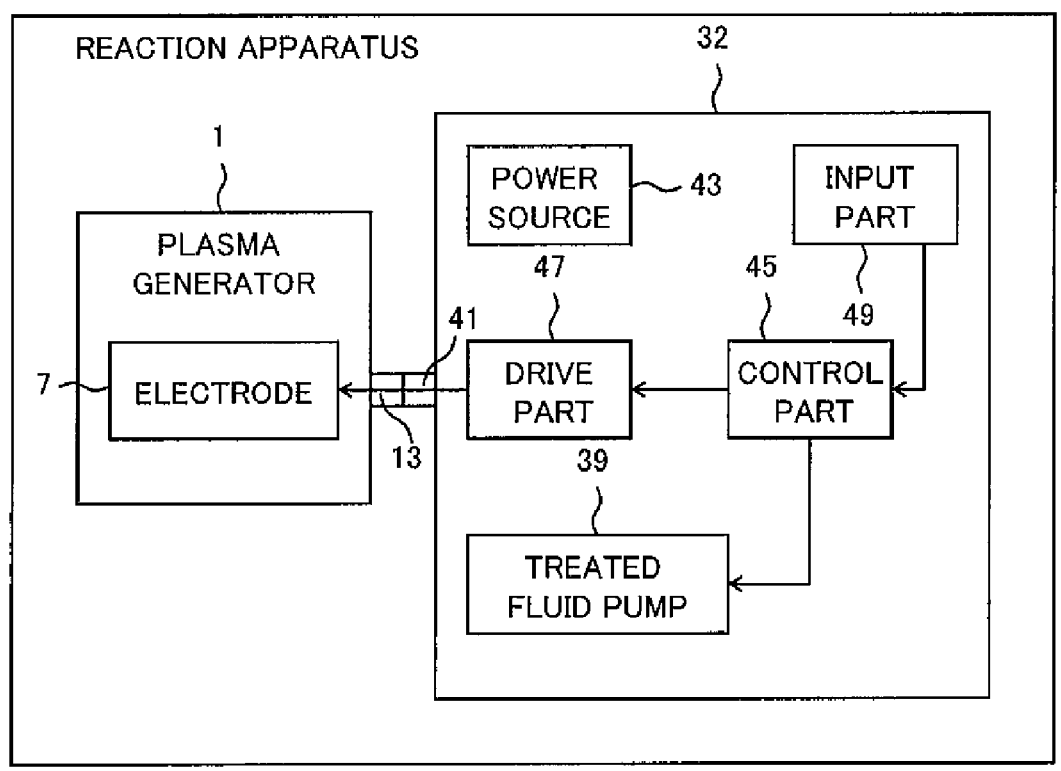
FIG. 9 A block diagram showing the configuration of an electrical system of the reaction apparatus of FIG. 8.

FIG. 9 is a block diagram showing the configuration of an electrical system of the reaction apparatus 31.

The reaction apparatus body 32 is provided with a terminal 41 connected to the terminal 13. The plasma generator 1 is driven and controlled by feed of electric power from the reaction apparatus body 32 through these terminals 13 and 41. Specifically, this is as follows.

A power source 43 includes, for example, a battery, and converts DC power from the battery to AC power or DC power having an appropriate voltage for supply. Alternatively, the power source 43 is connected to an external power source such as a commercial power source and converts AC power having a predetermined frequency from the external power source to AC power or DC power having an appropriate voltage for supply. The electric power of the power source 43 is supplied to a control part 45, a drive part (an example of the electrode control part) 47, an input part 49, and the treated fluid pump 39.

The drive part 47 converts electric power supplied from the power source 43 to AC power having a voltage in accordance with a control signal from the control part 45 and supplies power after the conversion through the terminals 41 and 13 to the electrode 7. The drive part 47 includes, for example, an inverter, transformer, or other power feed circuit. In the electrode 7, discharge in an amount in accordance with the voltage applied by the drive part 47 is carried out.

The treated fluid pump 39 includes, for example, although not particularly shown, a motor as the drive source of the pump and a motor driver driving the motor. The motor driver converts electric power supplied from the power source 43 to AC power or DC power having a voltage in accordance with the control signal from the control part 45 and applies the result to the motor. The motor rotates at a speed in accordance with the applied voltage. Accordingly, power in accordance with the applied voltage is applied to the treated fluid or cooling medium.

The input part 49 accepts an operation of a user and outputs a signal in response to the operation of the user to the control part 45. For example, the input part 49 receives a drive start operation of the reaction apparatus 31, a drive suspension operation, and an adjustment operation of the discharge amount and outputs a signal in response to the operation. The input part 49 is constituted by, for example, a control panel including various types of switches or a keyboard.

The control part 45 is configured by, for example, although not particularly shown, a computer provided with a CPU, ROM, RAM, or external memory device. The control part 45 outputs a control signal to the drive part 47 and the treated fluid use pump 39 based on the signal from the input part 49 etc.

For example, when a signal in response to the drive start operation of the reaction apparatus 31 is input from the input part 49, the control part 45 outputs a control signal to the drive part 47 so as to start supply of electric power to the electrodes 7, while when a signal in response to the drive suspension operation of the reaction apparatus 31 is input from the input part 49, outputs a control signal to the drive part 47 so as to suspend supply of electric power to the electrodes 7.

Note that, it is also possible to provide a temperature detection element, heater, and cooling medium flow passageway in the plasma generator and control the operation of the heater or the flow rate of the cooling use medium by the control part 45 based on a detection signal of the temperature detection element to adjust the temperature of the plasma generator.

According to the above fourth embodiment, the reaction apparatus 31 is provided with the plasma generator 1 suppressed in drop of plasma generating efficiency and damage due to thermal stress, therefore the reaction apparatus 31 can be used under a severe temperature environment.

Figure 13:
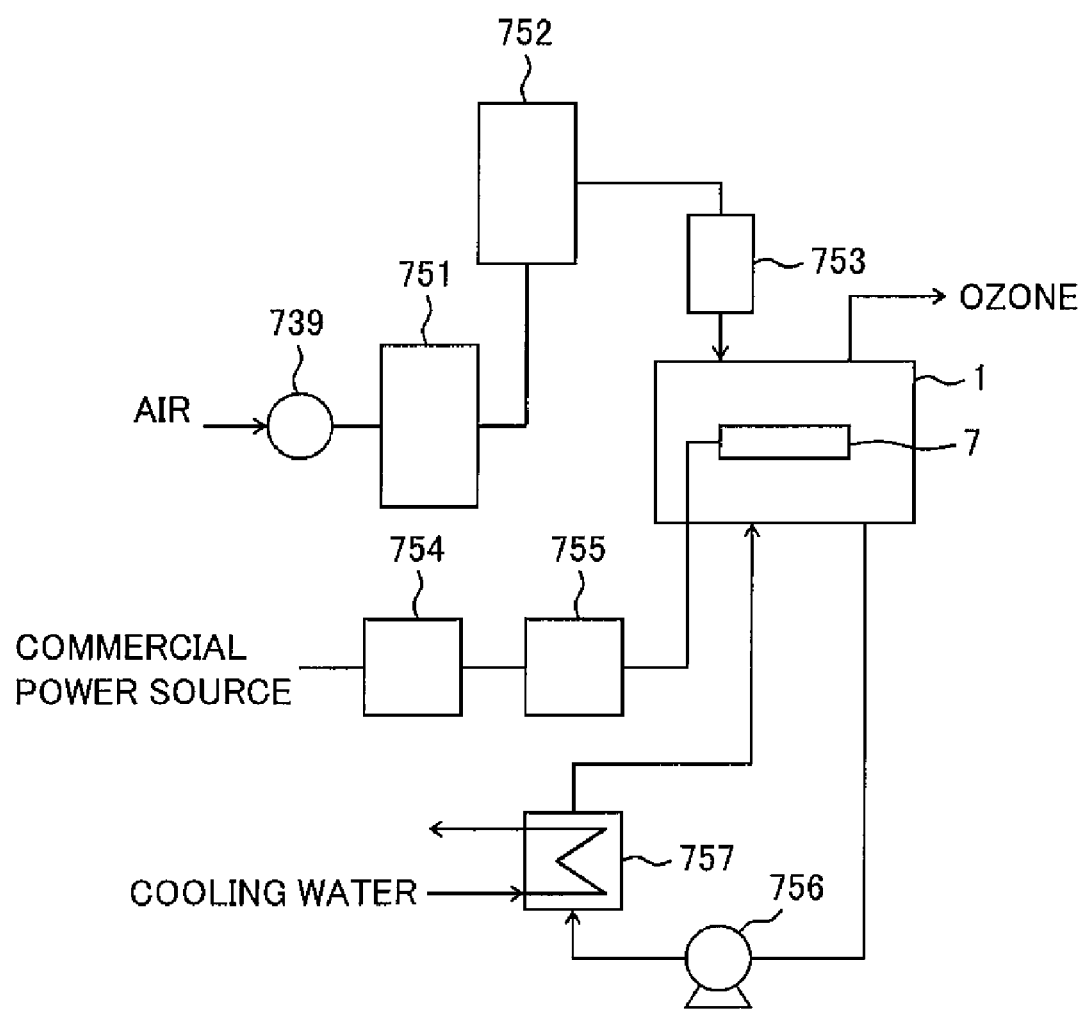
FIG. 13 A block diagram showing the configuration of an ozone generating apparatus as a concrete example of the reaction apparatus of FIG. 8.

FIG. 13 is a block diagram showing the configuration of an ozone generator 731 as a concrete example of the reaction apparatus 31.

The ozone generator 731 is a device generating ozone by treatment of air as the treated fluid and exhausting the result.

The ozone generated by the ozone generator 731 is used for an appropriate purpose such as sterilization, oxidation, decolorization, or deodorization. The mode of operation of the ozone generator 731 is as follows.

Air taken in by a blower 739 (corresponding to the pump 39) is cooled by an air cooling device 751, sent to a dehumidifier 752 to remove the moisture, then is heated by a regeneration heater 753 and is supplied as dry air at ordinary temperature to the plasma generator 1.

When AC voltage is applied to the electrode 7 of the plasma generator 1 by a power regulator 754 and a buck-boost converter 755 (corresponding to the power source 43 and/or drive part 47), silent discharge occurs between electrodes 7, a portion of the oxygen molecules in the introduced air is dissociated to oxygen atoms by the action of accelerated electrons by discharge, and the dissociated oxygen atoms react with other oxygen molecules, whereby the ozone is generated.

To the plasma generator 1, in order to eliminate heat generation along with discharge, cooling water is circulated by a cooling pump 756. This cooling water is cooled by heat exchange with secondary cooling water from the outside at a heat exchanger 757, and the obtained heat is taken out to the outside.

The present invention is not limited to the above embodiments and may be executed in various ways.

The first to fourth embodiments may be appropriately combined. For example, in the first embodiment, the connection parts 21 may be omitted, the plurality of partial electrodes 19 not directly connected within a layer, and, like in the third embodiment, the plurality of partial electrodes 19 of one electrode layer 15 connected to each other through another electrode layer 15.

The number of electrode layers included in one electrode is not limited to two. One electrode may include three or more electrode layers as well.

The electrode layers constituting one electrode may be completely superimposed over each other as well. Namely, the projected shape of one electrode layer or each electrode layer among a plurality of electrode layers in the direction over which the pair of electrodes face each other may coincide with the projected shape of a plurality of electrode layers in the direction over which the pair of electrodes face each other. Even in this case, a volume (sectional area) of electrode layers in each layer can be made smaller without making the volume (sectional area) of the entire electrodes smaller, therefore the load applied to the base member by the electrode layers due to the heat expansion difference in layers can be reduced without lowering the electric power supplied to the electrodes. Namely, breakage due to the thermal stress can be suppressed while suppressing the reduction of the generation efficiency of plasma.

The shapes, sizes, and positions of the electrode layer may be appropriately set. Further, the electrode layers are not limited to ones having a plurality of partial electrodes.

Figure 10A:
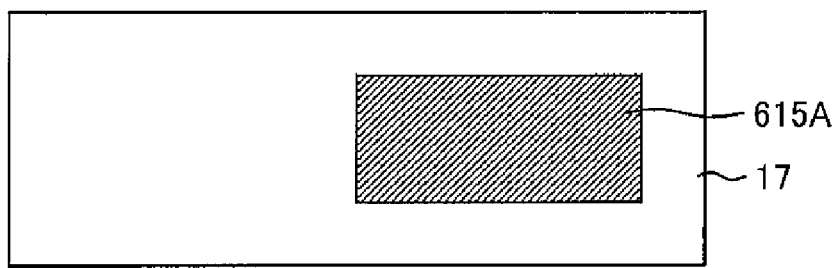
FIG. 10 A plan view showing a first modification of the electrode layer.
Figure 10B:
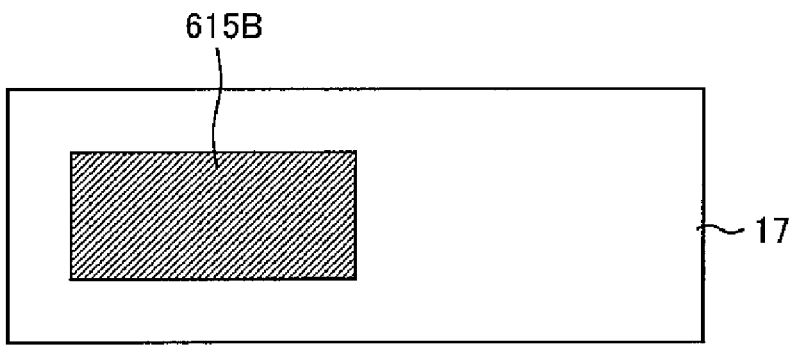

FIG. 10 is a plan view showing a first modification of the electrode layers. FIG. 10(a) is a plan view showing a first electrode layer 615A corresponding to the first electrode layer 15A of the first embodiment. FIG. 10(b) is a plan view showing a second electrode layer 615B corresponding to the second electrode layer 15B of the first embodiment. The first electrode layer 615A and second electrode layer 615B do not have partial electrodes, and have conductors constituting electrodes being densely arranged in all directions when viewed on a plane. Even in this case, by making the electrode area in each layer small, an electrode area in the entire plurality of layers large enough to contribute to the plasma generation can be secured while making the load applied to the base member by the electrode layers in each layer small.

A plurality of partial electrodes need not be provided in each electrode layer either. For example, a plurality of partial electrodes may be provided in only one electrode layer as well.

Figure 11A:
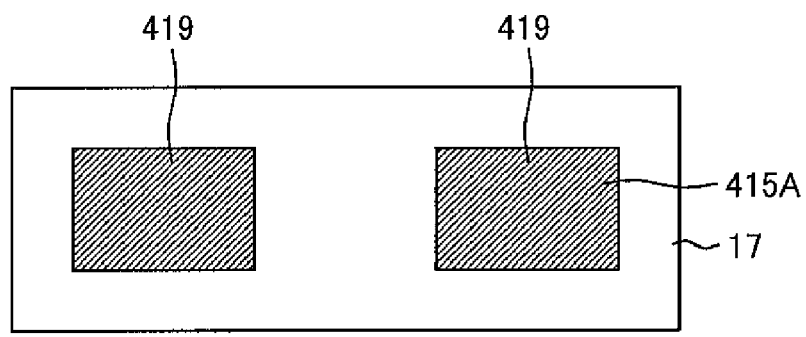
FIG. 11 A plan view showing a second modification of the electrode layer.
Figure 11B:
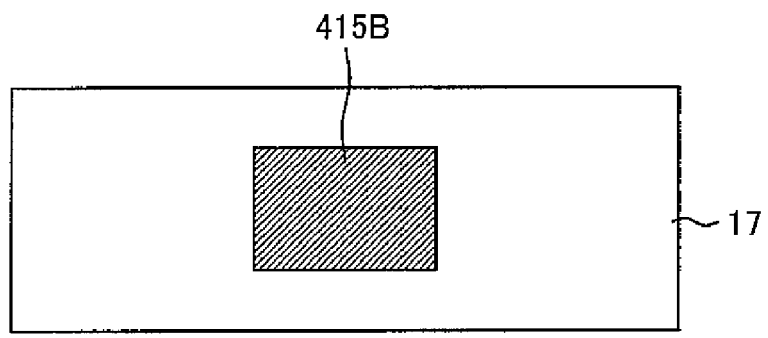

FIG. 11 is a plan view showing a second modification of the electrode layer. FIG. 11(a) is a plan view showing a first electrode layer 415A corresponding to the first electrode layer 15A of the first embodiment. FIG. 11(b) is a plan view showing a first electrode layer 415B corresponding to the second electrode layer 15B of the first embodiment.

The first electrode layer 415A has a plurality of partial electrodes 419. However, the second electrode layer 415B does not have partial electrodes. In this case as well, in the first electrode layer 415, the area of partial electrodes 419 is smaller than the area of the entire first electrode layer 415 (sum of areas of plurality of partial electrodes 419), therefore the load applied to the base member by the first electrode layer 415 due to the heat expansion difference can be dispersed.

The shapes, sizes, and positions of a plurality of partial electrodes may be appropriately set. The plurality of partial electrodes are not limited to rectangles or long shapes and may be triangles, pentagons, or other polygons as well or may be shapes not having corner parts such as circles or ovals. When a plurality of partial electrodes are aligned in one direction, the plurality of partial electrodes are not limited to ones aligned in the direction where the length of the electrode layer is shorter as in the first embodiment and may be ones aligned in the longitudinal direction as well. Further, the plurality of partial electrodes are not limited to ones which are regularly aligned or ones formed to the same shapes and sizes with respect to each other as shown in the first to third embodiments and may be ones irregularly aligned or ones formed to shapes and sizes different from each other as well. For example, partial electrodes to be arranged at positions where the thermal stress is apt to become large may be made smaller than partial electrodes arranged at other positions.

The plurality of partial electrodes may be connected in each electrode layer and made integral by one conductor as in the first and second embodiments as well. In this case, whether or not the electrode layer is constituted by a plurality of partial electrodes (whether or not at least a portion of each conductor which becomes the electrode is located at a different position when seen in the direction over which the pair of electrodes face each other) can be judged according to, for example, whether or not the arrangement regions and non-arrangement regions of conductors for forming electrode layers are aligned in a projected length of the entire electrode layers projected in a predetermined direction within the range overlapping the discharge space when seen in the direction over which the pair of electrodes face each other in part of the range in the predetermined direction.

For example, in FIG. 5(b), it can be judged whether or not the first electrode layer 15A has partial electrodes according to whether or not an arrangement region AR1 and a non-arrangement region AR2 of conductors which constitute the first electrode layer 15A are aligned in a projected length L2 of the entire first electrode layer 15A projected in a predetermined direction (left/right direction on the sheet surface) within a range L1 which is the range overlapping the discharge space 5 and a portion in the predetermined direction (left/right direction on the sheet surface). Note that, in examples of FIG. 6(a), FIG. 6(b), FIG. 7(a), and FIG. 7(b), both directions of the up/down direction of the sheet surface and the left/right direction of the sheet surface are grasped as the predetermined directions.

Note that, as understood from the above explanation, alignment of a plurality of partial electrodes while sandwiching non-arrangement regions of conductors constituting the electrode layers therebetween (arrangement with a space) is not an indispensable factor.

Figure 12A:
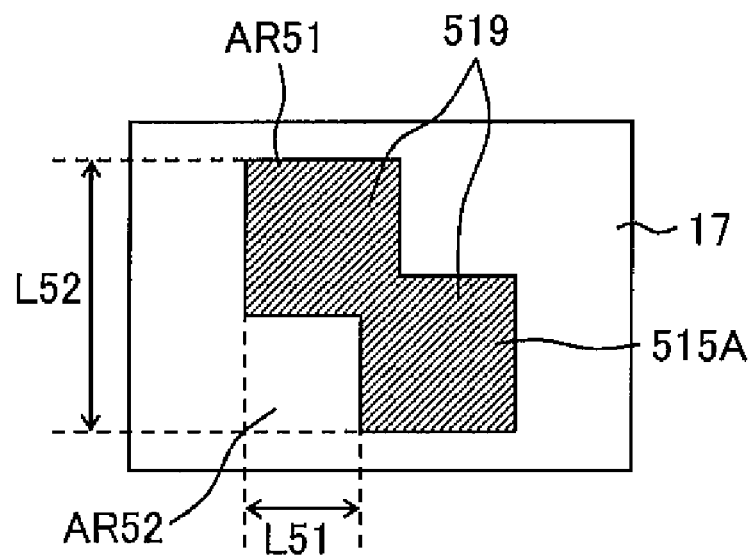
FIG. 12 A plan view showing a third modification of the electrode layer.
Figure 12B:
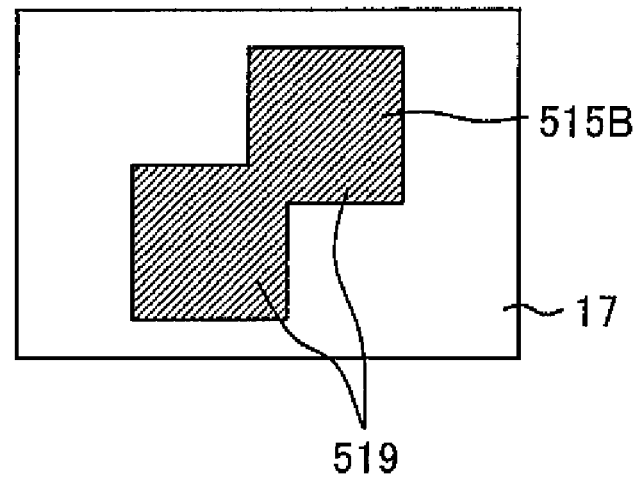

FIG. 12 is a plan view showing a third modification of the electrode layer. FIG. 12(a) is a plan view showing a first electrode layer 515A corresponding to the first electrode layer 15A of the first embodiment. FIG. 12(a) is a plan view showing a first electrode layer 515B corresponding to the second electrode layer 15B of the first embodiment.

The first electrode layer 515A and second electrode layer 515B have a plurality of partial electrodes 519. A plurality of partial electrodes 519 are not aligned to face each other while sandwiching a non-arrangement region AR52 of conductor constituting the electrode layer at all in the up/down direction of the sheet surface or the left/right direction of the sheet surface.

However, in FIG. 12(a), it is identified that the first electrode layer 515A has partial electrodes according to whether or not an arrangement region AR51 and a non-arrangement region AR52 of conductor which constitute the first electrode layer 515A are aligned in a projected length L52 of the entire first electrode layer 515A projected in a predetermined direction (left/right direction of the sheet surface) within a range L51 of a portion in the predetermined direction (left/right direction of the sheet surface).

However, it is also possible to consider that two partial electrodes 519 of the first electrode layer 515A are aligned while sandwiching a non-arrangement region AR52 of conductors constituting the first electrode layer 515A in an oblique direction of the sheet surface (diagonal direction of the insulating layer 17). Further, whether or not conductors constituting the electrode layer are aligned while sandwiching a non-arrangement region of conductors therebetween is useful for easily and conveniently identifying that the electrode layer is constituted by a plurality of partial electrodes.

The electrode layers do not have to be electrically connected to each other in the plasma generator (in an internal portion or on the surface of the base member). For example, a plurality of terminals may be arranged on the surface of the base member corresponding to a plurality of electrode layers, the plurality of terminals may be connected to the plurality of terminals of the drive part supplying electric power to the plasma generator, and the drive part may supply voltage to the plurality of terminals as well. In this case, the same voltage may be applied to a plurality of electrode layers constituting one electrode or voltages slightly different from each other may be applied by considering a difference of distance between electrode layers and the discharge spaces as well.

The shapes, sizes, and numbers of the discharge spaces may be appropriately set. For example, the number of the discharge spaces may be one, two, or four or more as well. Further, where the base member is constituted by a plurality of insulating layers, the number of insulating layers arranged between a plurality of electrode layers and between the electrode layers and the discharge spaces and the number of insulating layers forming the discharge spaces may be appropriately set. All of the electrode layers are not necessarily buried in the base member. The electrode layers on the sides closest to the discharge spaces may be exposed to the discharge spaces as well.

The plasma generator of the present embodiment may be used for various purposes. For example, in a reaction system apparatus, it may be utilized for a NOx converter/HC converter, dioxin converter, PFC converter, deodorizer, virus eliminator, ozone generator, or minus ion generator. Further, for example, in a light source apparatus, it may be utilized for a plasma lamp (fluorescent lamp, neon tube, etc.), etching device light source, resist light exposure device light source, or plasma display.

The invention claimed is:

1. A plasma generator comprising:
an insulating base member provided with a discharge space and
a pair of electrodes provided in the insulating base member, the pair of electrodes sandwiching the discharge space therebetween, wherein
at least one electrode of the pair of electrodes has a plurality of electrode layers provided at positions different from each other in a facing direction of the pair of electrodes,
each electrode layer has a plurality of partial electrodes located at positions different from each other when seen in the facing direction, thereby gaps are defined in each electrode layer,
the plurality of partial electrodes of each electrode layer are located between the plurality of partial electrodes of other electrode layer when seen in the facing direction, and
in each electrode layer, the plurality of partial electrodes are separated from each other in a predetermined direction when seen in the facing direction and are long shapes long in a direction perpendicular to the predetermined direction.

2. A plasma generator as set forth in claim 1, wherein the plurality of electrode layers are located so that a projected area of the plurality of electrode layers in the facing direction becomes larger than the projected area of each electrode layer in the facing direction.

3. A plasma generator as set forth in claim 1, wherein the insulating base member is long shape long in the direction perpendicular to the predetermined direction when seen in the facing direction.

4. A plasma generator as set forth in claim 1, further comprising:
a connection conductor extending in the facing direction and connecting the plurality of electrode layers, wherein
the plurality of electrode layers are superimposed on each other at only a position of the connection conductor when seen in the facing direction.

5. A plasma generator as set forth in claim 1, wherein:
the insulating base member is a laminate of a plurality of insulating layers, and
the plurality of electrode layers are provided between the plurality of insulating layers.

6. A plasma generator comprising:
an insulating base member provided with a discharge space and
a pair of electrodes provided in the insulating base member, the pair of electrodes sandwiching the discharge space therebetween, wherein
at least one electrode of the pair of electrodes has a plurality of electrode layers provided at positions different from each other in a facing direction of the pair of electrodes and a plurality of connection conductors extending in the facing direction and connecting the plurality of electrode layers,
each electrode layer has a plurality of partial electrodes located at positions different from each other when seen in the facing direction, thereby gaps are defined in each electrode layer, the plurality of partial electrodes of each electrode layer are located between the plurality of partial electrodes of other electrode layer when seen in the facing direction, and each partial electrode of each electrode layer is connected to the other electrode layer by the connection conductor corresponding to each partial electrode, thereby the plurality of partial electrodes of each electrode layer are electrically connected to each other through the other electrode layer.

7. A plasma generator as set forth in claim 6, wherein:

in each electrode, the layer has a plurality of partial electrodes are aligned in a plurality of rows when seen in the facing direction, are separated from each other in each row and are located between the plurality of partial electrodes of the adjacent row.

8. A plasma generator as set forth in claim 7, wherein each of the plurality of partial electrodes is a rectangular shape having sides parallel to rows of the plurality of partial electrodes and sides perpendicular to the rows.

9. A plasma generator as set forth in claim 6, wherein the plurality of electrode layers are superimposed on each other at only positions of the connection conductors when seen in the facing direction.

10. A reaction apparatus comprising:

a plasma generator having an insulating base member provided with a discharge space and a pair of electrodes provided on the insulating base member sandwiching the discharge space therebetween, a feed part capable of feeding a treated fluid to the discharge space, and an electrode control part capable of applying voltage to the electrodes so as to chemically change the treated fluid by generating plasma in the discharge space, wherein at least one electrode of the pair of electrodes has a plurality of electrode layers provided at positions different from each other in the facing direction of the pair of electrodes, each electrode layer has a plurality of partial electrodes located at positions different from each other when seen in the facing direction, thereby defining gaps in each electrode layer, the plurality of partial electrodes of each electrode layer are located between the plurality of partial electrodes of other electrode layer when seen in the facing direction, and in each electrode layer, the plurality of partial electrodes are separated from each other in a predetermined direction when seen in the facing direction and are long shapes long in a direction perpendicular to the predetermined direction.

11. A reaction apparatus comprising:

a plasma generator having an insulating base member provided with a discharge space and a pair of electrodes provided on the insulating base member sandwiching the discharge space therebetween, a feed part capable of feeding a treated fluid to the discharge space, and an electrode control part capable of applying voltage to the electrodes so as to chemically change the treated fluid by generating plasma in the discharge space, wherein at least one electrode of the pair of electrodes has a plurality of electrode layers provided at positions different from each other in a facing direction of the pair of electrodes and a plurality of connection conductors extending in the facing direction and connecting the plurality of electrode layers, each electrode layer has a plurality of partial electrodes located at positions different from each other when seen in the facing direction, thereby gaps are defined in each electrode layer, the plurality of partial electrodes of each electrode layer are located between the plurality of partial electrodes of other electrode layer when seen in the facing direction, and each partial electrode of each electrode layer is connected to the other electrode layer by the connection conductor corresponding to each partial electrode, thereby the plurality of partial electrodes of each electrode layer are electrically connected to each other through the other electrode layer.

\* \* \* \* \*